United States Patent [19]

Distelrath

[11] Patent Number: 4,867,110
[45] Date of Patent: Sep. 19, 1989

[54] SUCTION SYSTEM FOR A MULTI-CYLINDER INTERNAL COMBUSTION ENGINE

[75] Inventor: Winfried Distelrath, Stuttgart, Fed. Rep. of Germany

[73] Assignee: Dr. Ing. h.c.F. Porsche AG, Fed. Rep. of Germany

[21] Appl. No.: 282,576

[22] Filed: Dec. 12, 1988

[30] Foreign Application Priority Data

Dec. 11, 1987 [DE] Fed. Rep. of Germany ....... 3742057

[51] Int. Cl.$^4$ .................... F02B 75/06; F02M 35/10
[52] U.S. Cl. ............................................ 123/52 MC
[58] Field of Search .......... 123/52 M, 52 MC, 52 MB

[56] References Cited

U.S. PATENT DOCUMENTS

| | | | |
|---|---|---|---|
| 2,801,620 | 8/1957 | Goodridge | 123/52 MV |
| 4,646,689 | 3/1987 | Katsumoto et al. | 123/52 MB |
| 4,765,286 | 8/1988 | Lyjak et al. | 123/52 MB |

FOREIGN PATENT DOCUMENTS

| | | | |
|---|---|---|---|
| 3420703 | 12/1985 | Fed. Rep. of Germany. | |
| 3641811 | 5/1988 | Fed. Rep. of Germany. | |
| 0188027 | 10/1984 | Japan | 123/52 MB |
| 1012425 | 12/1965 | United Kingdom | 123/52 M |

Primary Examiner—David A. Okonsky
Attorney, Agent, or Firm—Barnes & Thornburg

[57] ABSTRACT

A suction installation for a multi-cylinder internal combustion engine which includes a vessel-like manifold device from which suction pipes extend toward a cylinder head of the internal combustion engine. The shape of the entire manifold device corresponds to a sphere whereby the suction pipes are aligned toward the center of the sphere; the air is conducted to the cylinders of the internal combustion engine from the interior space of the sphere.

26 Claims, 5 Drawing Sheets

SUCTION SYSTEM FOR A MULTI-CYLINDER INTERNAL COMBUSTION ENGINE

BACKGROUND AND SUMMARY OF THE INVENTION

The invention relates to a suction installation for a multi-cylinder internal combustion engine with a container-like manifold device from which extend suction pipes that adjoin directly or indirectly a cylinder head.

A known suction installation, DE-OS No. 34 20 703, includes a container or vessel with a first hemispherically shaped housing, on which is mounted a second conically shaped housing. Individual suction pipes which are extended to the container, extend on the inside of the container adapted to be filled with a liquid medium and more particularly up to the second housing. Apparently, a sealing wall is provided between the two housings. This construction entails the disadvantage that the volume in the second housing is hardly sufficient so as to be able to make available in a functionally correct manner the pulsating air demand of an internal combustion engine, for example, with four cylinders. Additionally, the geometry of the circularly shaped throttle valve housing and of the second conical housing causes flow losses by reason of the velocity distribution of the air—slowly along the edge, rapidly in the center—which impair disadvantageously the power output behavior of the internal combustion engine.

It is the object of the present invention to provide an internal combustion engine-suction installation which, combined with a spatially favorable construction and reduced weight, contributes to the gas-dynamic optimization of the suction side of the internal combustion engine.

The underlying problems are solved according to the present invention in that the shape of the entire manifold-like device, especially its inner surface delimiting an interior space corresponds to a sphere and the suction pipes connected to the manifold-like device are aligned with their center lines to the center of the sphere, whereby the suction pipes supply the cylinders of the internal combustion engine with air from the interior space of the sphere.

The advantages principally achieved with the present invention reside in that the gas-dynamic friction losses are significantly reduced by the spherical shape of the manifold-like device whereby the efficiency—torque, consumption—of the internal combustion engine is improved. Additionally, the sphere-manifold-like device requires little space with a given volume which, on the one hand, simplifies the layout of the equally long suction pipes and, on the other, facilitates the accommodation of auxiliary aggregates of the internal combustion engine. Owing to the favorable ratio of surface to volume with this manifold-like device, the material expenditure for the suction installation is less with the consequence that the latter has less weight and can be manufactured more simply.

The alignment of the suction pipes toward the sphere center not only assures good gas flow conditions, but also that the connection of the suction pipes at the manifold device can be constructed circumferentially funnel-shaped as desired. As a result of the alternate supply of air by way of the suction pipes to the cylinders and more particularly in dependence on the ignition sequence of the internal combustion engine, it is achieved that the entire sphere volume is available to each suction pipe during the suction stroke, as a result of which a defined good mixture distribution is achieved. Stated differently, a mutual impairment of the suction pipes by unequal spacings, for example, as would be the case with a non-spherical geometric shape of a manifold-like device can be dispensed with.

Therebeyond, the suspended arrangement of the manifold-like device contributes to the fact that the space in the immediate vicinity of the internal combustion engine can be utilized well. Finally, the connection of the suction installation with the cylinder head and the support at the vehicle creates a decoupled bearing support which has a noise-reducing effect.

DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein.

DETAILED DESCRIPTION OF THE DRAWINGS

Figure 1:
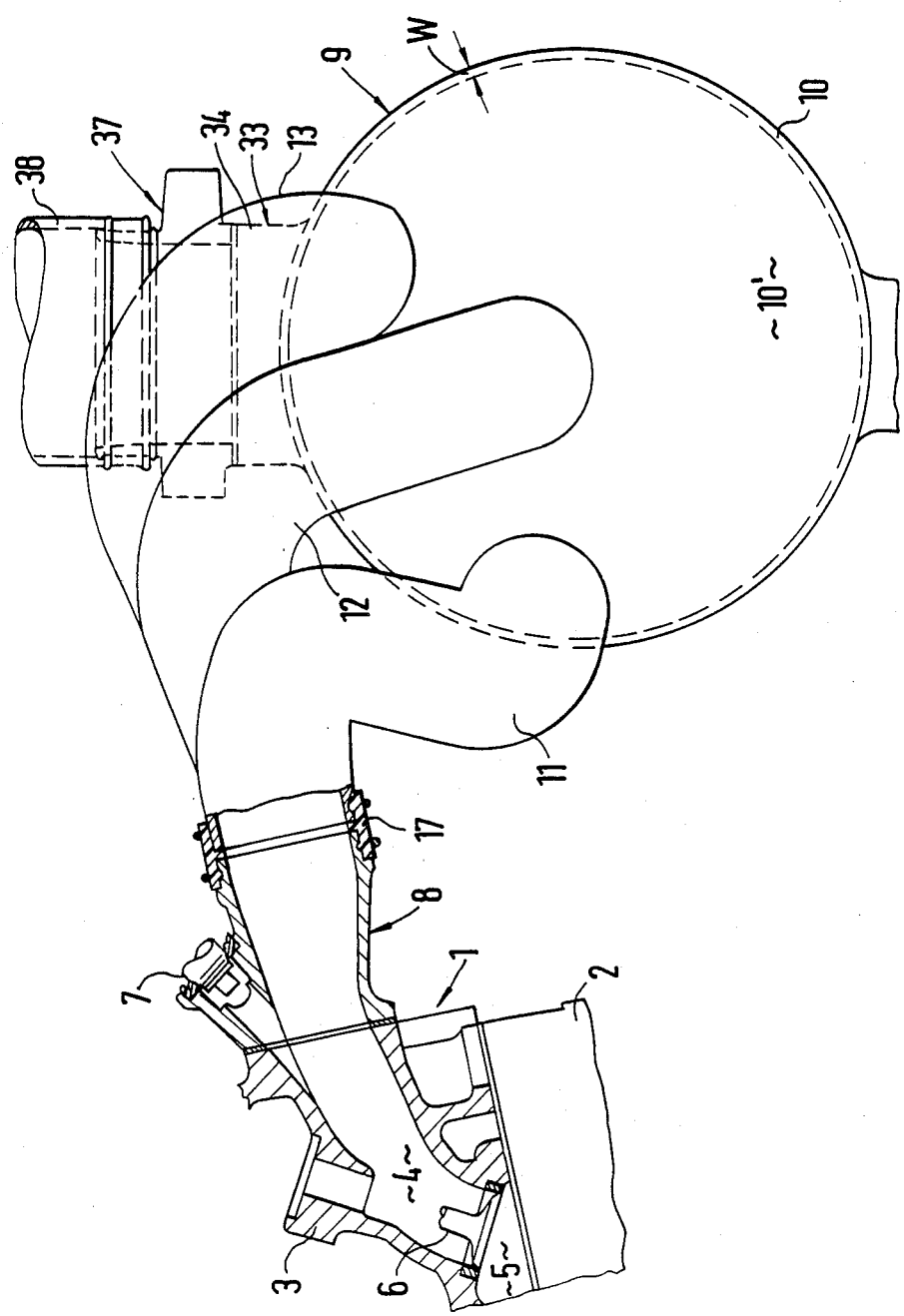
FIG. 1 is a partial cross-sectional view of an internal combustion engine with a suction installation according to the present invention.

Referring now to the drawing wherein like reference numerals are used throughout the various views to designate like parts, the multi-cylinder internal combustion engine generally designated by reference numeral 1 (FIG. 8) of the reciprocating piston-type construction operates according to the four-cycle process and includes a crankcase 2 and a cylinder head 3. It includes six cylinders arranged in-line and is installed essentially vertically into a motor vehicle (not shown), for example, into a passenger car.

The cylinder head 3 includes per cylinder at least one suction channel 4 (FIG. 1) by way of which a fuel-air mixture reaches the combustion space 5. The feed of the fuel-air mixture to the combustion space 5 correct with respect to the working cycle takes place by means of a lift valve 6 which is actuated from the cylinder head 3 by way of a cam shaft (not shown).

Figure 2:
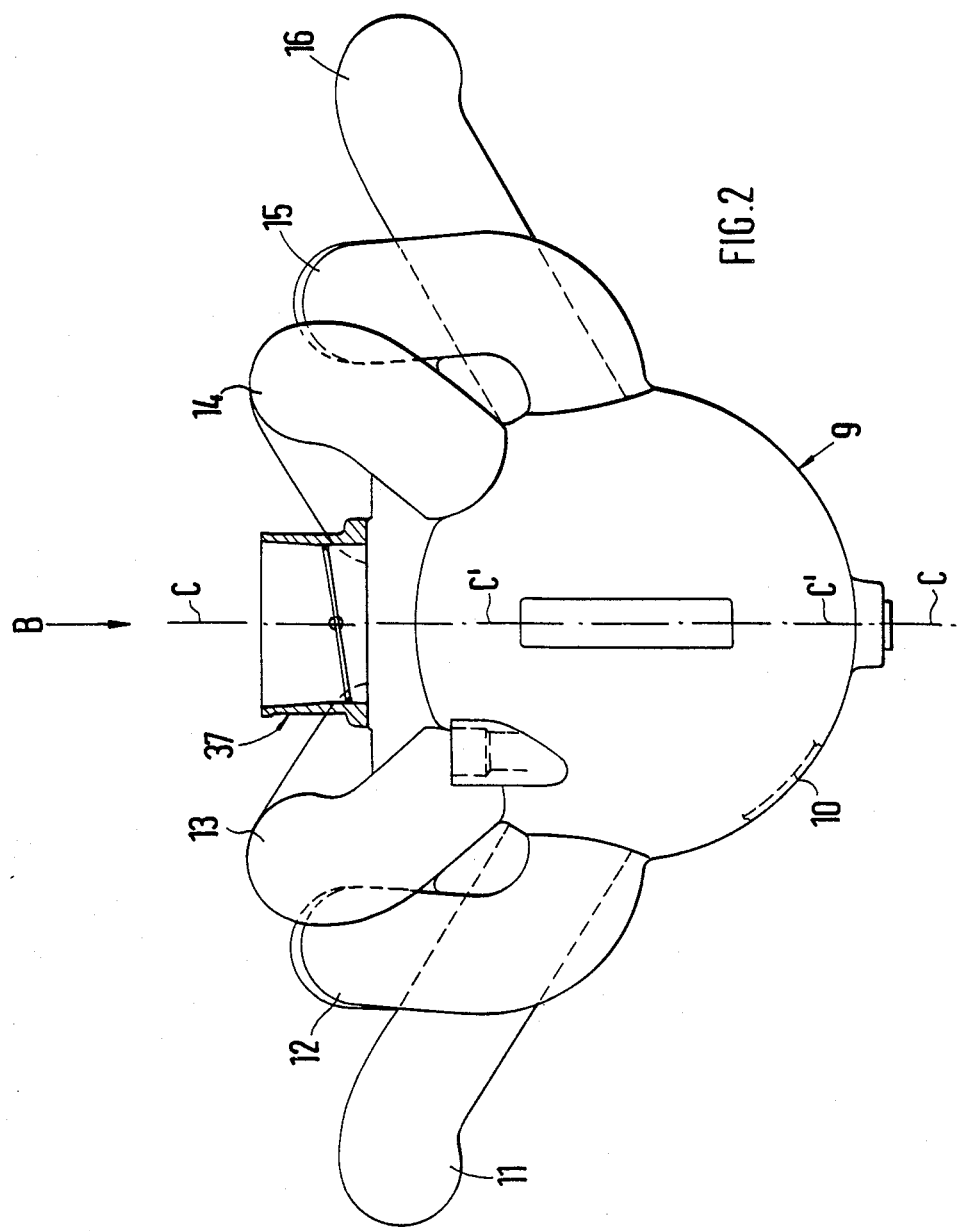
FIG. 2 is an elevational view in the direction of arrow A of FIG. 1, on a reduced scale.
Figure 3:
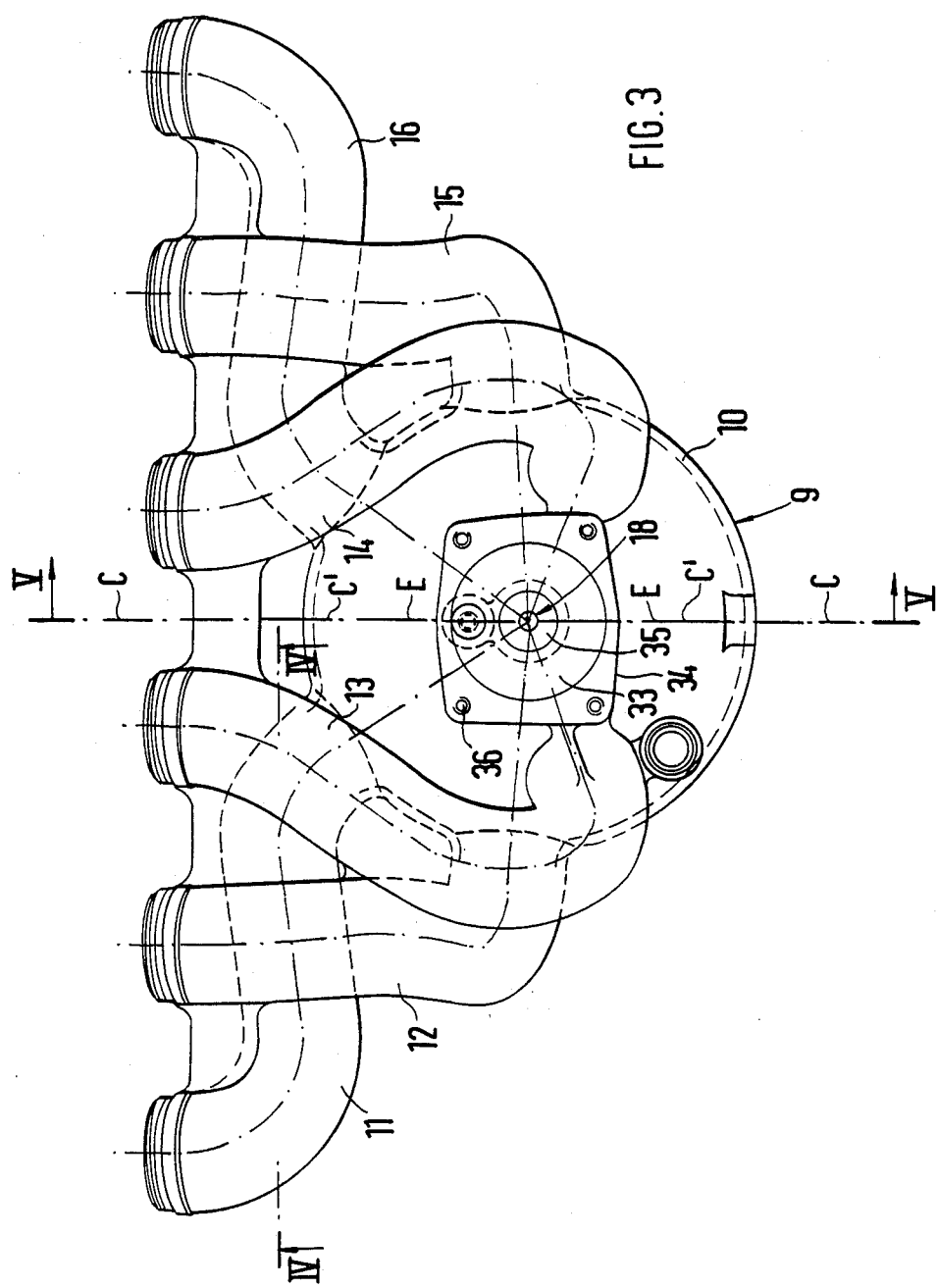
FIG. 3 is an elevational view in the direction of arrow B of FIG. 2.
Figure 8:
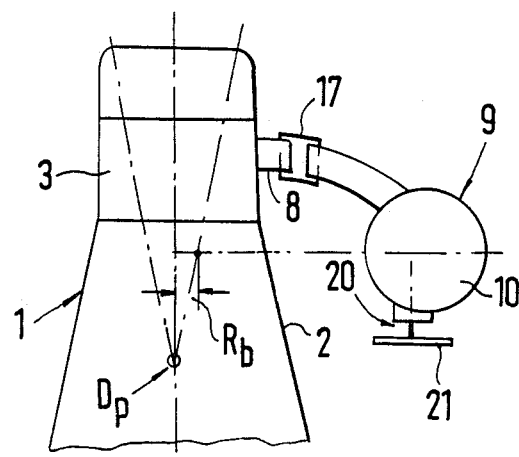
FIG. 8 is a schematic view of the internal combustion engine with the suction installation in accordance with the present invention.

A fuel-injection valve is indicated at 7 (FIG. 1) which is inserted into an intermediate member 8 screwed together with the cylinder head 3 (FIGS. 1 and 8). The intermediate member 8 extends laterally from the cylinder head 3 and is connected with a suction installation generally designated by reference numeral 9. The suction installation 9 includes a vessel-like or container-like manifold device 10, from which suction pipes 11, 12, 13 and 14, 15, 16 extend away (FIGS. 2 and 3). The suction pipes 11, 12, 13 and 14, 15, 16 are connected with the intermediate member 8 by means of sleeve-like elastic connecting elements 17 (FIGS. 1 and 8); connecting elements corresponding to the aforementioned ones are described in detail in the DE-P No. 36 41 811.

Figure 5:
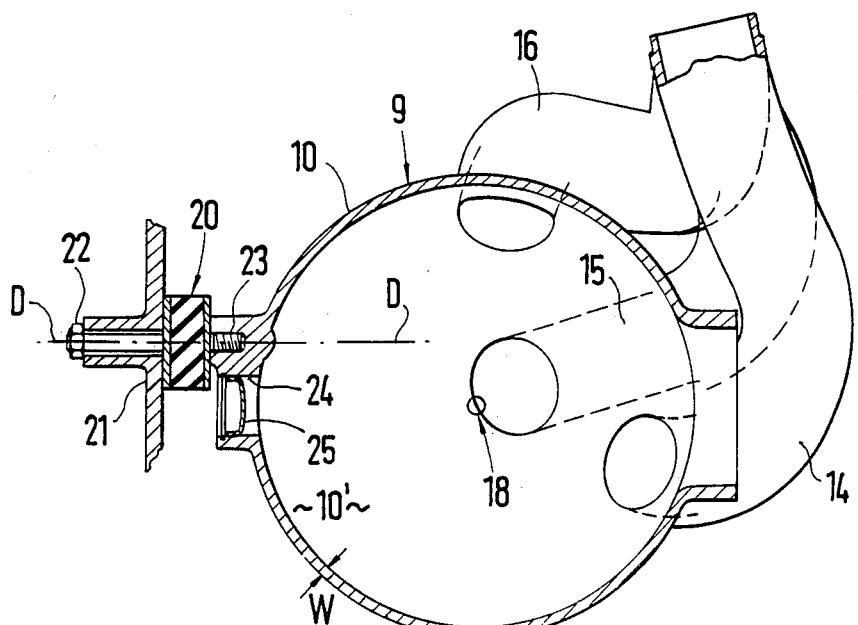
FIG. 5 is a cross-sectional view, taken along line V—V of FIG. 3.
Figure 6:
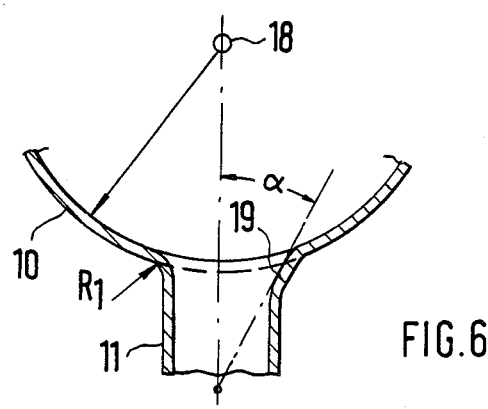
FIG. 6 is a cross-sectional view through the suction pipe installation in accordance with the present invention within the transition area of suction pipe-manifold-like device.

The shape of the entire manifold device 10, i.e., the inner surface and outer surface, corresponds to a sphere that has a center 18 (FIGS. 3 and 5). The interior space of the manifold device 10 is designated by reference numeral 10' (FIGS. 1 and 5); the wall thickness W (FIG. 1) of the sphere, is essentially constant. Suction pipes 11, 12, 13 and 14, 15, 16 have essentially the same length and are so connected with the manifold device 10 that they are aligned with their center lines toward the center 18 (FIGS. 3 and 6). Possible connections of the suction Pipe, for example, with the manifold device 10, are illustrated in FIG. 6. According to FIG. 6, the suction pipe 11 may pass over into the wall W of the manifold device 10 by means of the radius $R_1$ or by way of the funnel-shaped chamfering 19; the chamfering 19 is defined by the angle $\alpha$.

Identical lengths of the suction pipes 11, 12, 13 and 14, 15, 16 can be realized in a simple manner if a center cross plane C—C (FIG. 3) of the internal combustion engine 1 includes a sphere-bisecting line C'—C' (FIG. 2) of the manifold device 10. Insofar as the manifold device 10 is arranged laterally of the internal combustion engine 1 approximately at the height between the crankcase 2 and the cylinder head 3, the relative movements $R_b$ of the internal combustion engine 1 about their point of rotation $D_p$ with respect to the suction installation 9 are small (FIG. 8). As a result thereof, a bearing support of the suction installation 9 can be realized decoupled from the internal combustion engine 1. This bearing support is formed, on the one hand, by the connecting elements 17 and, on the other, by means of an elastic member 20, on which the manifold device 10 is supported with its bottom side. The member 20 is secured at a fixed part 21 of the motor vehicle by means of a bolt 22 (FIG. 5). Additionally, it is screwed into a thread 23 of the manifold device 10. The elastic member 20 engages at the manifold device 10 in proximity of a vertical center of gravity line D—D of the suction installation 9 (FIG. 5). Adjacent the elastic element 20, an opening 24 is provided at the manifold device 10 for a casting bore, whereby a closure lid 25 is inserted into the opening 24. If the manifold device 10 is connected with the suction pipes 11, 12, 13 and 14, 15, 16 in such a manner that it is suspended from the latter, then spatially favorable prerequisites are created.

Figure 4:
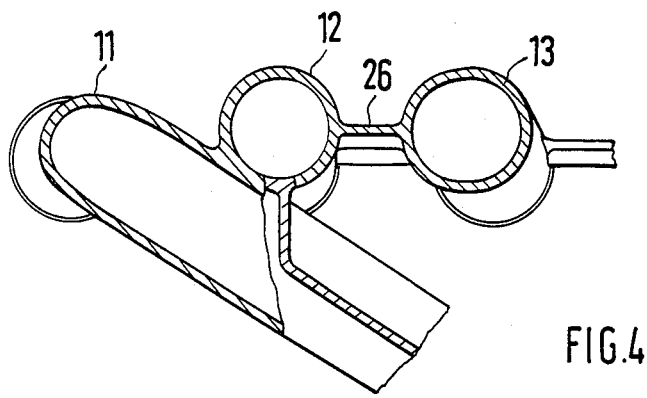
FIG. 4 is a cross-sectional view, taken along line IV—IV of FIG. 3.
Figure 7:
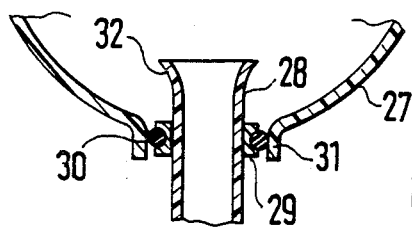
FIG. 7 is a cross-sectional view, similar to FIG. 6, of a modified embodiment in accordance with the present invention.

According to FIGS. 4 and 6, the suction installation 9 consists of a metallic or plastic casting, i.e., the suction pipes 11, 12, 13 and 14, 15, 16 are made in one piece with the manifold device. At least a part of the suction pipes, namely, 2 and 13 (FIG. 4) are thereby connected with each other by a web 26. However, the possibility also exists to make the manifold device 27 and suction pipes 28 separate from one another, for example, of plastic material (FIG. 7). The suction pipes 28 are thereby inserted into neck-like apertures 31 of the manifold device 27 by means of bearings 29 and sealing members 30. The suction pipes 28 protrude with inlet funnels 32 into the manifold device 27. In this embodiment, two suction pipes 11 and 16, 12 and 15, 13 and 14 attached on the two sides of the sphere bisecting line C'—C' of the manifold device 10 can have identical configurations or may be identical parts. The internal combustion engine 1 which includes six cylinders of in-line construction operates with the ignition sequence 1-5-3-6-2-4. Depending on this ignition sequence, air is conducted alternately to the cylinders by way of the suction pipes 11, 15; 13, 16; 12, 14 which are attached, respectively, on the two sides of the sphere-bisecting line C'—C'.

The manifold device 10 includes at its top side a short air inlet connection 33 (FIGS. 1 and 3) which is located on a center plane E—E of the sphere bisecting line C'—C' (FIG. 3). The air inlet connection 33 is formed by a neck 34 which is provided with a circularly shaped opening 35. Additionally, threaded bores 36 for the fastening of a throttle valve housing 37 are provided at the neck 34. Finally, the throttle valve housing 37 is provided with a tubular portion 38 which leads to an air filter (not shown) of the internal combustion engine.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A suction installation for a multi-cylinder internal combustion engine, comprising vessel-like manifold means, suction pipe means extending from said manifold means which are adapted to be operatively connected with a cylinder head, the shape of the entire manifold means corresponding substantially to a sphere, and the suction pipe means connected with the manifold means being aligned with their center lines substantially to the center of the sphere, whereby the suction pipe means supply the cylinders of the internal combustion engine with air from the interior space of the sphere.

2. A suction installation according to claim 1, wherein the suction pipe means are connected directly with the cylinder head.

3. A suction installation according to claim 1, wherein the suction pipe means are connected indirectly with the cylinder head.

4. A suction installation according to claim 1, wherein the interior surface of the sphere of the manifold means which delimits its interior space corresponds substantially to a sphere.

5. A suction installation according to claim 1, for an internal combustion engine of the reciprocating piston-type construction with at least two in-line cylinders, wherein a center cross plane of the internal combustion engine includes a sphere bisecting line of the manifold means.

6. A suction installation according to claim 5, wherein the manifold means is arranged laterally of the internal combustion engine.

7. A suction installation according to claim 5, wherein the suction pipe means are essentially of equal length.

8. A suction installation according to claim 7, wherein the manifold means and the suction pipe means are made in one piece.

9. A suction installation according to claim 8, wherein the manifold means and the suction pipe means are made in one piece from a casting consisting of an iron-metal or plastic material.

10. A suction installation according to claim 8, wherein at least a portion of the suction pipe means are connected with each other by web means.

11. A suction installation according to claim 7, wherein the manifold means and the suction pipe means are separately made parts.

12. A suction installation according to claim 11, wherein the suction pipe means are inserted into neck-like mounting means of the manifold means by the use of bearing means and sealing means.

13. A suction installation according to claim 11, wherein the suction pipe means protrude into the manifold means by means of an inlet funnel.

14. A suction installation according to claim 1, wherein at least two suction pipe means attached at the manifold means on the two sides of a sphere-bisecting line have essentially the same configuration.

15. A suction installation according to claim 1, wherein air is alternately supplied to the cylinders of the internal combustion engine in dependence on the ignition sequence of the internal combustion engine by way of the suction pipe means which are attached at the manifold means on the two sides of a sphere-bisecting line.

16. A suction installation according to claim 1, wherein the manifold means includes an air inlet connection which is located substantially on a center plane of a sphere-bisecting line.

17. A suction installation according to claim 16, wherein the air inlet connection is formed by a neck having a substantially circularly shaped opening, the neck being provided with threaded bores for the fastening of a throttle valve housing.

18. A suction installation according to claim 1, wherein the internal combustion engine is installed essentially vertically into a motor vehicle in such a manner that the cylinder head extends above a crankcase, and wherein the suction pipe means are extended to the manifold means from above in such a manner that the manifold means is suspended from the suction pipe means.

19. A suction installation according to claim 18, wherein the free side of the suction pipe means are retained by means of elastic sleeve-like connecting elements at an intermediate member secured at the cylinder head, and wherein the manifold means is supported at its bottom side on a fixed part of the motor vehicle by means of an elastic element.

20. A suction installation according to claim 19, wherein the elastic element engages in proximity of a vertical center of gravity line of the suction installation.

21. A suction installation according to claim 1, wherein the suction pipe means are essentially of equal length.

22. A suction installation according to claim 1, wherein the manifold means and the suction pipe means are made in one piece.

23. A suction installation according to claim 1, wherein at least a portion of the suction pipe means are connected with each other by web means.

24. A suction installation according to claim 1, wherein the manifold means and the suction pipe means are separately made parts.

25. A suction installation according to claim 24, wherein the suction pipe means are inserted into neck-like mounting means of the manifold means by the use of bearing means and sealing means.

26. A suction installation according to claim 25, wherein the suction pipe means protrude into the manifold means by means of an inlet funnel.

* * * * *